US011401026B2

(12) United States Patent
Reinhart et al.

(10) Patent No.: US 11,401,026 B2
(45) Date of Patent: Aug. 2, 2022

(54) STRUCTURAL COMPOSITE AIRFOILS WITH A SINGLE SPAR, AND RELATED METHODS

(71) Applicant: The Boeing Company, Chicago, IL (US)

(72) Inventors: Donald Drew Reinhart, Snohomish, WA (US); Ross Westermeier, Seattle, WA (US); Bryan Gruner, Bellevue, WA (US); Jan A. Kordel, Redmond, WA (US)

(73) Assignee: The Boeing Company, Chicago, IL (US)

( * ) Notice: Subject to any disclaimer, the term of this patent is extended or adjusted under 35 U.S.C. 154(b) by 226 days.

(21) Appl. No.: 16/880,099

(22) Filed: May 21, 2020

(65) Prior Publication Data
US 2021/0362827 A1  Nov. 25, 2021

(51) Int. Cl.
*B64C 3/26* (2006.01)
*B64C 3/18* (2006.01)

(52) U.S. Cl.
CPC ............... *B64C 3/26* (2013.01); *B64C 3/185* (2013.01)

(58) Field of Classification Search
None
See application file for complete search history.

(56) References Cited

U.S. PATENT DOCUMENTS

| 1,803,030 A | 7/1929 | Messerschmitt |
| 1,875,593 A | 9/1932 | Hall |
| 3,167,129 A | 1/1965 | Shultz |
| 3,333,642 A | 8/1967 | Kee |
| 3,910,531 A | 10/1975 | Leomand |
| 3,994,452 A | 11/1976 | Cole |
| 5,843,355 A | 12/1998 | McCarville et al. |

(Continued)

FOREIGN PATENT DOCUMENTS

| BR | 102017007099 A2 | 10/2017 |
| CA | 3000916 A1 | 12/2018 |

(Continued)

OTHER PUBLICATIONS

English language machine translation of Brazilian Patent Application Publication No. BR102017007099-A2, published Oct. 10, 2017.

(Continued)

*Primary Examiner* — Alexander S Thomas
(74) *Attorney, Agent, or Firm* — Dascenzo Gates Intellectual Property Law, P.C.

(57) ABSTRACT

Structural composite airfoils include a primary structural element and a secondary structural element defining a trailing edge of the structural composite airfoil. The primary structural element includes an upper skin panel, a lower skin panel, and a middle C-channel spar that is coupled to the upper skin panel and the lower skin panel. An upper flange of the middle C-channel spar is coupled to the upper skin panel, while a lower flange of the middle C-channel spar is coupled to the upper skin panel and the lower skin panel. An internal volume is defined by the upper skin panel and the lower skin panel aft of the middle C-channel spar, and is defined by the upper skin panel forward of the middle C-channel spar. The leading edge region of the primary structural element defines the leading edge of the structural composite airfoil.

20 Claims, 5 Drawing Sheets

(56) References Cited

U.S. PATENT DOCUMENTS

| | | |
|---|---|---|
| 6,375,120 B1 | 4/2002 | Wolnek |
| 7,393,183 B2 | 7/2008 | Keller |
| 8,684,309 B2 | 4/2014 | Wildman |
| 8,853,313 B2 | 10/2014 | Miller |
| 9,522,504 B2 | 12/2016 | Garcia Martin et al. |
| 9,656,738 B2 | 5/2017 | Murta et al. |
| 9,745,048 B2 | 8/2017 | Wood |
| 10,173,789 B2 | 1/2019 | Rodman |
| 10,228,005 B2 | 3/2019 | Wilson et al. |
| 10,532,804 B2 | 1/2020 | Santini |
| 2005/0227582 A1 | 10/2005 | Kloos |
| 2005/0238491 A1 | 10/2005 | Morrison et al. |
| 2008/0258008 A1 | 10/2008 | Cooper |
| 2010/0308170 A1 | 12/2010 | Hadley et al. |
| 2015/0353185 A1 | 12/2015 | Petiot et al. |
| 2016/0244143 A1 | 8/2016 | Foster et al. |
| 2018/0043639 A1 | 2/2018 | Autry et al. |
| 2018/0086429 A1 | 3/2018 | Sheppard |
| 2018/0127080 A1 | 5/2018 | Tyler et al. |
| 2018/0155004 A1 | 6/2018 | Woolcock |
| 2018/0222571 A1 | 8/2018 | Santini |
| 2018/0346094 A1 | 12/2018 | Deck et al. |
| 2019/0061901 A1 | 2/2019 | Long |

FOREIGN PATENT DOCUMENTS

| | | |
|---|---|---|
| DE | 3726909 A1 | 2/1989 |
| EP | 1176089 | 1/2002 |
| EP | 3360778 | 8/2018 |
| EP | 3409580 | 12/2018 |
| GB | 2266085 A | 10/1993 |
| WO | WO 2014/170690 | 10/2014 |

OTHER PUBLICATIONS

English language machine translation of German Patent Application Publication No. DE3726909A1, published Feb. 23, 1989.

STRUCTURAL COMPOSITE AIRFOILS WITH A SINGLE SPAR, AND RELATED METHODS

FIELD

The present disclosure relates generally to structural composite airfoils and related methods.

BACKGROUND

Aircraft, including fixed-wing aircraft and rotary-wing aircraft, employ a variety of aerodynamic control surfaces, such as ailerons, air brakes, elevators, flaps, rudders, slats, spoilers and the like. By manipulating one or more of the aerodynamic control surfaces, a pilot may control the lift generated by the aircraft, such as during takeoff, climbing, descending and landing, as well as the aircraft's orientation about its pitch, roll, and yaw axes. For example, the trailing edge of a wing of a fixed-wing aircraft typically includes one or more flaps, with the flaps being moveable between retracted and extended positions. At cruise, the flaps are typically maintained in a retracted position. When extended, the flaps increase the camber of the wing. Therefore, during takeoff, climbing, descending, or landing, the flaps may be extended, either partially or fully, to increase the maximum lift coefficient and effectively reduce the stalling speed of the aircraft. Said aerodynamic control surfaces are typically airfoils formed of composite materials, and thus are referred to herein as structural composite airfoils.

Structural composite airfoils, such as flaps, have an aerodynamic cross-sectional profile that is typically formed by connecting an upper skin to a lower skin proximate both the leading edge and the trailing edge of the structural composite airfoil. In conventional construction of inboard and outboard flaps, for example, a primary structural element of the flap is defined by the upper and lower skins being coupled to three spars that extend the width of the flap. The leading edge of the structural composite airfoil (which typically includes a bullnose shape), and the trailing edge (which is tapered to a thin cross-section) are typically outside of the primary structural element, forming respective secondary structural elements of the flap. Various fasteners and components (e.g., splice straps and/or nut plates) are used to secure the upper and lower skins to the spars and other structures that form the flap. Large numbers of fasteners can increase costs, manufacturing cycle time, and weight of the resulting assemblies. Accordingly, those skilled in the art continue research and development efforts directed to improving structural composite airfoils and the manufacturing thereof.

SUMMARY

Structural composite airfoils and related methods of forming said structural composite airfoils as disclosed herein may reduce fastener counts, improve airfoil aerodynamic surfaces, and/or simplify manufacturing processes for structural composite airfoils.

An example of a structural composite airfoil according to the present disclosure includes a primary structural element and a secondary structural element defining a trailing edge of the structural composite airfoil. The structural composite airfoil has a leading edge and a trailing edge, and the primary structural element extends from a leading edge region to a trailing edge region. The leading edge region of the primary structural element forms the leading edge of the structural composite airfoil. The primary structural element includes an upper skin panel, a lower skin panel, and a middle C-channel spar. An internal volume is defined between the upper skin panel and the lower skin panel aft of the middle C-channel spar, and is further defined by just the upper skin panel forward of the middle C-channel spar. The middle C-channel spar includes an upper flange coupled to the upper skin panel, and a lower flange coupled to the lower skin panel and the upper skin panel. The upper skin panel extends from an upper leading edge end to an upper trailing edge end, and the lower skin panel extends from a lower leading edge end to a lower trailing edge end. The lower leading edge end of the lower skin panel is coupled to the upper skin panel.

Methods of assembling such structural composite airfoils are also disclosed. In such methods, the upper skin panel is coupled to the upper flange of the middle C-channel spar, and the lower skin panel and the upper skin panel are coupled to the lower flange of the middle C-channel spar. In this manner, the internal volume is defined between the upper skin panel and the lower skin panel aft of the middle C-channel spar, and is defined by the upper skin panel forward of the middle C-channel spar.

DESCRIPTION

Figure 1:
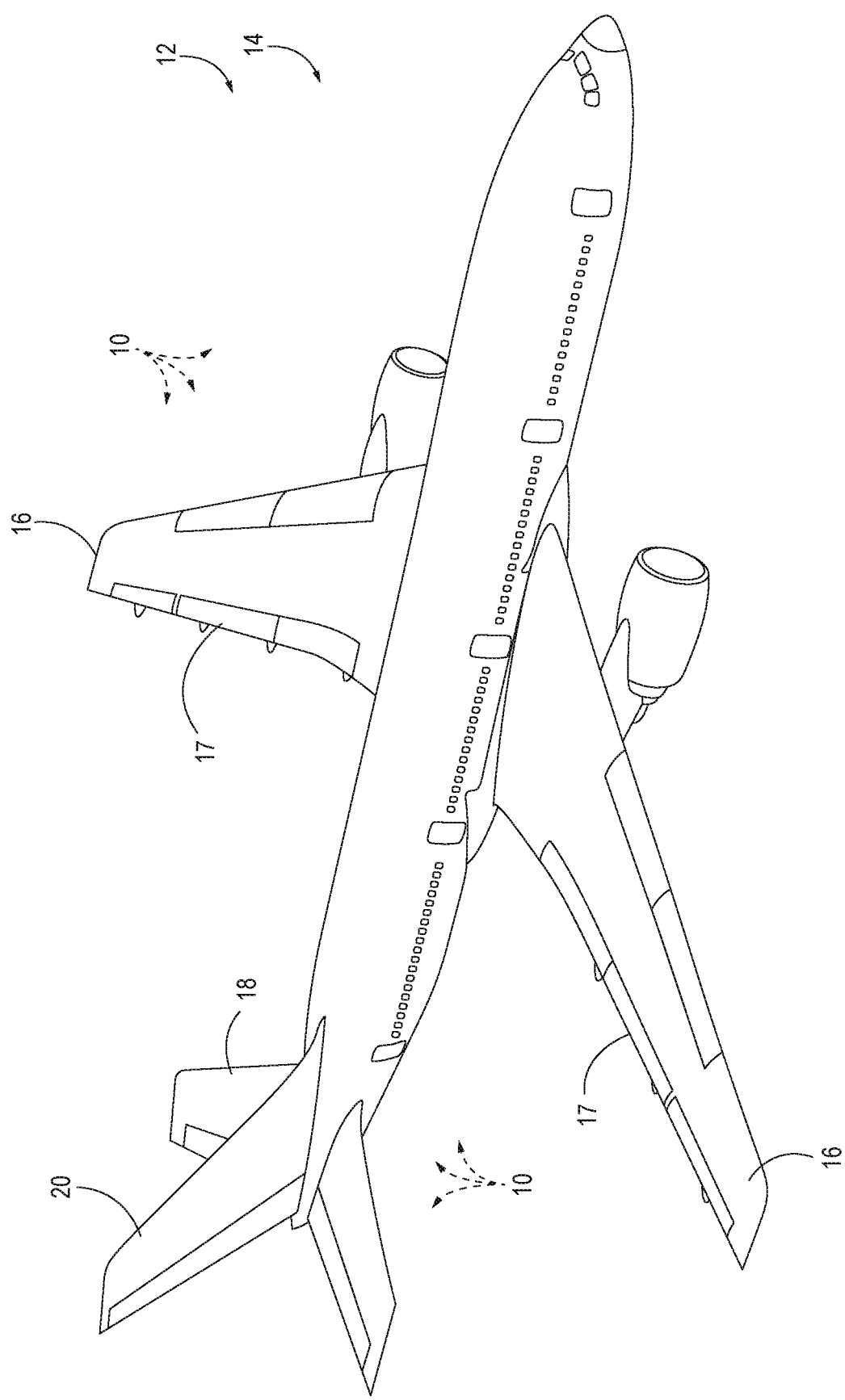
FIG. 1 is a schematic representation of an apparatus that may include one or more structural composite airfoils according to the present disclosure.

With reference to FIG. 1, one or more structural composite airfoils 10 may be included in an apparatus 12. Structural composite airfoils 10 may be utilized in many different industries and applications, such as the aerospace, automotive, military, architecture, wind power generation, remote control aircraft, marine, recreation, and/or motorsport industries. In FIG. 1, an example of apparatus 12 that may include one or more structural composite airfoils 10 generally is illustrated in the form of an aircraft 14. Aircraft 14 may take any suitable form, including commercial aircraft, military aircraft, or any other suitable aircraft. While FIG. 1 illustrates aircraft 14 in the form of a fixed-wing aircraft, other types and configurations of aircraft are within the scope of aircraft 14 according to the present disclosure, including (but not limited to) rotorcraft and helicopters.

Apparatus 12 (e.g., aircraft 14) may include one or more structural composite airfoils 10. As illustrative, non-exclusive examples, structural composite airfoils 10 may be utilized in wings 16 (e.g., flaps 17, which may be inboard or outboard flaps), though other components of aircraft 14, such as horizontal stabilizers 18, vertical stabilizers 20, and other components additionally or alternatively may include one or more structural composite airfoils 10. Other applications in aircraft 14 (or other apparatus 12) for structural composite airfoils 10 may include other wing control surfaces, ailerons, flaperons, air brakes, elevators, slats, spoilers, canards, rudders, and/or winglets. In other industries, examples of apparatus 12 including one or more structural composite airfoils 10 may include or be a portion of space satellites, transit vehicles, shipping containers, rapid transit vehicles, automobile bodies, propeller blades, turbine blades, and/or marine vehicles, among others.

Figure 2:
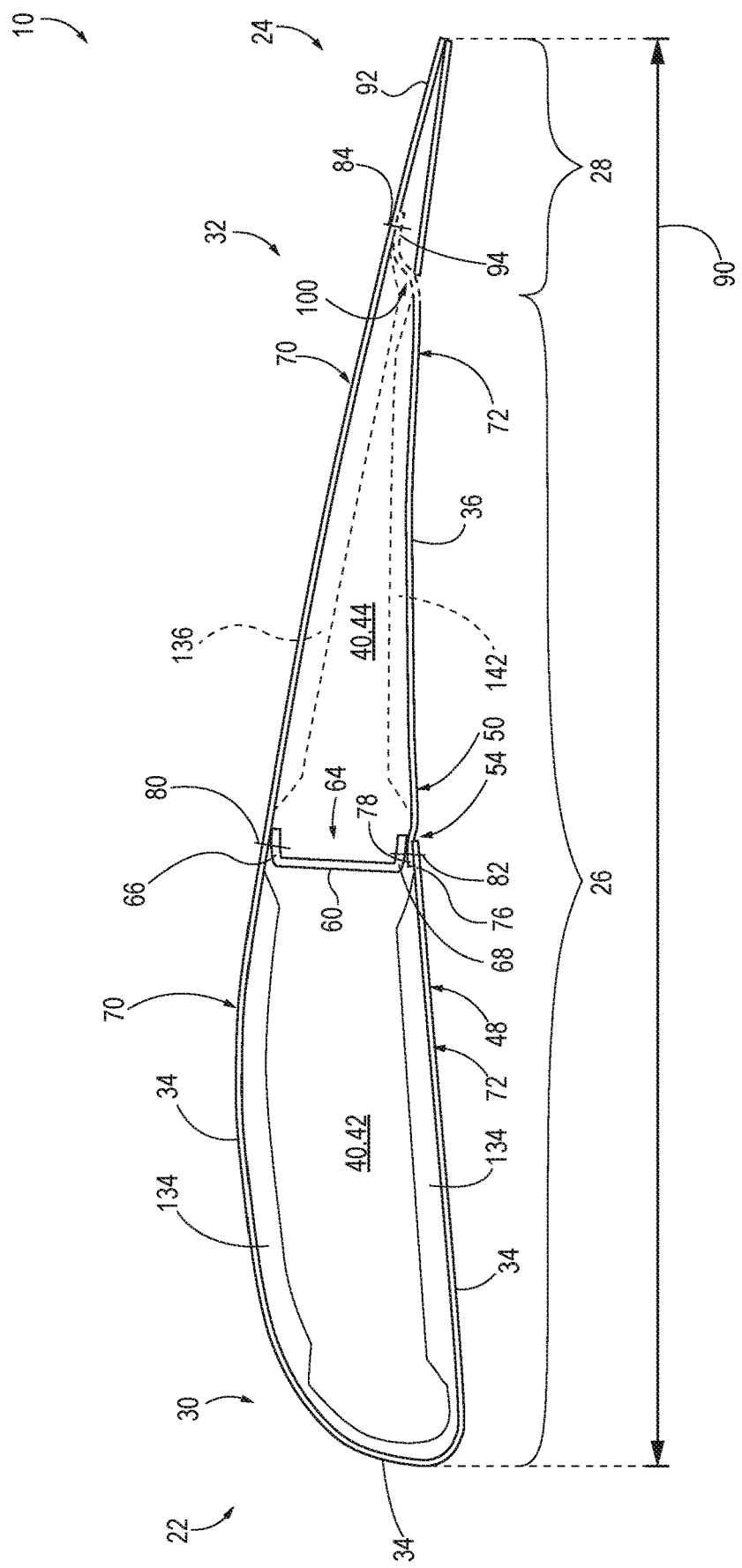
FIG. 2 is a schematic, side elevation representation of examples of structural composite airfoils according to the present disclosure.

FIG. 2 provides illustrative, non-exclusive examples of structural composite airfoils 10 according to the present disclosure. In general, elements that are likely to be included are illustrated in solid lines, while elements that are optional are illustrated in dashed lines. However, elements that are shown in solid lines are not essential to all examples, and an element shown in solid lines may be omitted from a particular example without departing from the scope of the present disclosure.

Structural composite airfoil 10 has a leading edge 22 and a trailing edge 24, and generally includes a primary structural element 26 and a secondary structural element 28. As used herein, a "primary structural element" is an element or structure which carries flight, ground, or pressurization loads, and whose failure would reduce the structural integrity of the apparatus or assembly of which structural composite airfoil 10 is a part. As used herein, a "secondary structural element" is an element or structure whose failure does not affect the safety of the apparatus or assembly of which structural composite airfoil 10 is a part.

Primary structural element 26 extends from a leading edge region 30 to a trailing edge region 32. As shown in FIG. 2, leading edge region 30 forms, or defines, leading edge 22 of structural composite airfoil 10. Leading edge region 30 may be said to be the region of primary structural element 26 that is closest to leading edge 22. Similarly, trailing edge region 32 may be said to be the region of primary structural element 26 that is closest to trailing edge 24, though trailing edge region 32 of primary structural element 26 may not define trailing edge 24 of structural composite airfoil 10. As used herein, a first element or structure is said to be "aft" of another element or structure if the first element or structure is positioned closer to trailing edge 24 than is the other element or structure. Similarly, as used herein, a first element or structure is said to be "forward" of another element or structure if the first element or structure is positioned closer to leading edge 22 than is the other element or structure.

Primary structural element 26 includes at least an upper skin panel 34, a lower skin panel 36, and a middle C-channel spar 60. Middle C-channel spar 60 is arranged such that a channel 64 faces trailing edge 24 in the example shown in FIG. 2, though in other examples, middle C-channel spar 60 may be arranged such that channel 64 faces leading edge 22. Primary structural element 26 also includes an internal volume 40, with internal volume 40 being defined between upper skin panel 34 and lower skin panel 36 aft of middle C-channel spar 60. However, because upper skin panel 34 extends along an upper airfoil surface 70 of structural composite airfoil 10, continues around leading edge 22, and wraps back around to middle C-channel spar 60 adjacent a lower airfoil surface 72 of structural composite airfoil 10, internal volume 40 is defined by just the upper skin panel 34 forward of middle C-channel spar 60.

Middle C-channel spar 60 includes an upper flange 66 and a lower flange 68, with upper flange 66 being coupled to upper skin panel 34, and lower flange 68 being coupled to both upper skin panel 34 and to lower skin panel 36. Upper skin panel 34 generally extends from an upper leading edge end 76 to an upper trailing edge end 92. Upper trailing edge end 92 corresponds to the end of upper skin panel 34 that is closest to trailing edge 24 of structural composite airfoil 10. Upper skin panel 34 may be continuous from upper leading edge end 76 to upper trailing edge end 92. Similarly, lower skin panel 36 generally extends from a lower leading edge end 78 to a lower trailing edge end 94. Lower leading edge end 78 corresponds to the end of lower skin panel 36 that is closest to leading edge 22, though as shown in the example of FIG. 2, lower leading edge end 78 is not necessary adjacent leading edge 22, and may be positioned between leading edge 22 and trailing edge 24, such as adjacent the position of middle C-channel spar 60. Lower trailing edge end 94 corresponds to the end of lower skin panel 36 that is closest to trailing edge 24. Lower skin panel 36 may be continuous from lower leading edge end 78 to lower trailing edge end 94. In the example shown in FIG. 2, upper leading edge end 76 of upper skin panel 34 is coupled to lower leading edge end 78, with both upper leading edge end 76 and lower leading edge end 78 being additionally coupled to lower flange 68 of middle C-channel spar 60 at the same location. In other examples, upper leading edge end 76 may be coupled to lower leading edge end 78 in a different location than where lower flange 68 of middle C-channel spar 60 is coupled to upper skin panel 34 and lower skin panel 36, though the two locations generally will be adjacent, or near one another in such cases.

Upper leading edge end 76 of upper skin panel 34 and lower leading edge end 78 of lower skin panel 36 generally meet in an overlapping configuration (i.e., one generally overlaps the other). For example, lower leading edge end 78 may include and/or be adjacent to a middle joggle 54 configured to receive upper leading edge end 76 of upper skin panel 34. Middle joggle 54 may be a slight bend in lower skin panel 36 adjacent lower leading edge end 78, wherein lower skin panel 36 bends slightly upwards toward upper airfoil surface 70. In this manner, lower leading edge end 78 may overlap and engage with upper skin panel 34 (and lower leading edge end 78 may be closer to upper airfoil surface 70 than is upper leading edge end 76), while a first lower surface 48 of upper skin panel 34 may be at least substantially flush with a second lower surface 50 of lower skin panel 36. In other examples of structural composite airfoil 10, middle joggle 54 may be formed in upper skin panel 34, adjacent upper leading edge end 76. In these examples, middle joggle 54 may be a slight bend in upper skin panel 34 upwards towards upper airfoil surface 70, with middle joggle 54 being configured to receive lower leading edge end 78 such that upper leading edge end 76 of upper skin panel 34 and lower leading edge end 78 of lower skin panel 36 may overlap while first lower surface 48 of upper skin panel 34 remains at least substantially flush with second lower surface 50 of lower skin panel 36. In the example shown in FIG. 2, upper skin panel 34 and lower skin panel 36 are arranged such that upper leading edge end 76 is positioned below (e.g., further from upper airfoil surface 70) lower leading edge end 78 at the point where the two overlap, though in other examples, lower leading edge end 78 may be positioned below upper leading edge end 76 where they overlap and are coupled together.

Middle joggle 54 (whether formed in upper skin panel 34 or lower skin panel 36) may be configured to facilitate coupling of upper skin panel 34 and lower skin panel 36 without needing a splice strap to couple the panels 34, 36. Structural composite airfoil 10 may include a sealant, filler material, resin, or other material that is configured to smooth lower airfoil surface 72 in the area of middle joggle 54, and/or where upper leading edge end 76 is coupled to lower leading edge end 78.

Leading edge 22 of structural composite airfoil 10 may be generally shaped to have a bullnose shape. Lower leading edge end 78 of lower skin panel 36 is coupled to upper leading edge end 76 of upper skin panel 34 aft of leading edge region 30 of primary structural element 26, at the location of lower flange 68 of middle C-channel spar 60 in FIG. 2. In other examples, however, lower leading edge end 78 may be coupled to upper leading edge end 76 of upper skin panel 34 forward or aft of lower flange 68 of middle C-channel spar 60. In some examples, upper leading edge end 76 may be coupled to lower leading edge end 78 within leading edge region 30 of primary structural element 26. In other words, the location of the interface between upper leading edge end 76 and lower leading edge end 78 may be varied forward or aft of middle C-channel spar 60 in various examples of structural composite airfoil 10. For example, upper skin panel 34 may be shortened and lower skin panel 36 may be lengthened such that the two overlap forward of middle C-channel spar 60. In other examples, upper skin panel 34 may be lengthened and lower skin panel 36 may be shortened such that the two overlap aft of middle C-channel spar 60.

As shown in FIG. 2, structural composite airfoils 10 may be provided without any C-channel spar within in leading edge region 30 of primary structural element 26, which can provide a cost and/or weight savings for structural composite airfoil 10, though structural composite airfoils 10 having a discrete front C-channel spar are also within the scope of the present disclosure. Instead of a discrete front C-channel spar component coupled to upper skin panel 34 and lower skin panel 36 near leading edge 22, structural composite airfoil 10 may be strengthened within leading edge region 30. Specifically, materials and panel configurations of upper skin panel 34 may be configured to strengthen leading edge 22 as well as provide the bullnose shape of leading edge 22.

For example, each of upper skin panel 34 and lower skin panel 36 may be a composite panel formed of a plurality of layers (plies) of a fiber-reinforced polymer that are laminated together. For example, upper skin panel 34 and lower skin panel 36 may be formed of carbon fiber reinforced polymer material or fiberglass reinforced polymer material. In other examples, upper skin panel 34 and/or lower skin panel 36 may be a metallic material, a polymer, or other suitable material. At least a portion of upper skin panel 34 may be core stiffened. As used herein, "core stiffened" refers to skin panels having at least a first skin and a low-density core material coupled to the skin. Core stiffened materials optionally include a second skin, with the core material sandwiched between the first and second skins to form a sandwich panel. Suitable materials for forming core stiffened portions are well known in the art, and include honeycomb core materials and metallic core materials, though other core materials are within the scope of the present disclosure.

As an illustrative example, upper skin panel 34 may include a first upper core stiffened portion 134 and a second upper core stiffened portion 136. First upper core stiffened portion 134 may be positioned such that it extends from a position adjacent upper leading edge end 76, around leading edge 22, and along upper airfoil surface 70 to middle C-channel spar 60, as shown in FIG. 2. Put another way, first upper core stiffened portion 134 extends forward of middle C-channel spar 60 along upper airfoil surface 70, around leading edge 22 of structural composite airfoil 10, and then continues to extend aft back towards middle C-channel spar 60 along lower airfoil surface 72. Second upper core stiffened portion 136 may be positioned such that it extends between middle C-channel spar 60 and an integral Z-spar 100 or upper trailing edge end 92. In the example shown in FIG. 2, first upper core stiffened portion 134 is positioned forward of middle C-channel spar 60, and second upper core stiffened portion 136 is positioned aft of middle C-channel spar 60. One or more of upper core stiffened portions 134, 136 may be tapered, such as in areas of the respective portion near middle C-channel spar 60 and/or integral Z-spar 100. For example, upper core stiffened portion 134 and/or 136 may have a height or thickness extending away from upper skin panel 34 into internal volume 40, with said height or thickness decreasing in the vicinity of middle C-channel spar 60 and/or integral Z-spar 100, thereby forming the taper. In the example of FIG. 2, the thickness of first upper core stiffened portion 134 is tapered adjacent middle C-channel spar 60, and the thickness of second upper core stiffened portion 136 is tapered adjacent middle C-channel spar 60 and integral Z-spar 100. In other examples, the height or thickness of upper core stiffened portion 134 and/or 136 may be substantially constant, rather than tapering where the respective upper core stiffened portion 134 and/or 136 meets middle C-channel spar 60 and/or integral Z-spar 100. In some examples, upper core stiffened portion 134 and/or 136 may abut middle C-channel spar 60 and/or integral Z-spar 100. Additionally or alternatively, the thickness of one or more of upper core stiffened portions 134, 136 may be varied at different locations of the respective portion. For example, the thickness of first upper core stiffened portion 134 may be reduced within leading edge region 30 of primary structural element 26, or adjacent leading edge 22, as compared to segments of first upper core stiffened portion 134 aft of leading edge 22 and/or leading edge region 30.

While upper skin panel 34 as shown in FIG. 2 includes two distinct upper core stiffened portions 134, 136, in other examples, upper skin panel 34 may be core stiffened along its entire length, along a greater or lesser portion of its length, and/or may include more or fewer discrete upper core stiffened portions than is shown in FIG. 2. Additionally or alternatively, each respective upper core stiffened portion 134, 136 may extend to a greater or lesser extent than is shown in FIG. 2. First upper core stiffened portion 134 may be configured to define the shape of leading edge 22, or form leading edge 22, such as by being continuously present along leading edge 22. First upper core stiffened portion 134 is present adjacent lower airfoil surface 72 forward of middle C-channel spar 60, around leading edge 22, and adjacent upper airfoil surface 70 forward of middle C-channel spar 60. Thus, in the example of FIG. 2, upper panel 34 effectively forms the entire structural composite airfoil forward of middle C-channel spar 60, and is core stiffened along substantially the entire portion of upper skin panel 34 forward of middle C-channel spar 60. First upper core stiffened portion 134 and/or second upper core stiffened portion 136 may be overexpanded honeycomb core, in some examples.

Additionally or alternatively, at least a portion of lower skin panel 36 may be core stiffened. As an illustrative example, lower skin panel 36 includes a lower core stiffened portion 142 aft of middle C-channel spar 60. Lower core stiffened portion 142 may be positioned such that it extends between middle C-channel spar 60 and integral Z-spar 100 or lower trailing edge end 94. Lower core stiffened portion 142 may be tapered, such as in areas near middle C-channel spar 60 and/or integral Z-spar 100. For example, lower core stiffened portion 142 may have a height, or thickness, that extends away from lower skin panel 36 into internal volume 40 (e.g., towards upper skin panel 34), with said height or thickness decreasing in the vicinity of middle C-channel 60 and integral Z-spar 100, thereby forming the taper in the example of FIG. 2. In other examples, the height or thickness of lower core stiffened portion 142 may be substantially constant, rather than tapering where it meets middle C-channel spar 60 and/or integral Z-spar 100. In some examples, lower core stiffened portion 142 may abut middle C-channel spar 60 and/or integral Z-spar 100.

While lower skin panel 36 as shown in FIG. 2 includes one lower core stiffened portions 142, in other examples, lower skin panel 36 may be core stiffened along its entire length, may be core stiffened along a greater or lesser portion of its length, and/or may include a plurality of discrete lower core stiffened portions. For example, lower core stiffened portion 142 may be a plurality of discrete core stiffened portions spaced apart between middle C-channel spar 60 and secondary structural element 28.

Additionally or alternatively, lower core stiffened portion 142 may extend to a greater or lesser extent than is shown in FIG. 2. In some examples, lower core stiffened portion 142 may extend all the way to lower leading edge end 78. In some examples, lower core stiffened portion 142 may extend all the way to lower trailing edge end 94. Lower core stiffened portion 142 may be overexpanded honeycomb core.

Structural composite airfoil 10 may be described in terms of upper airfoil surface 70 and lower airfoil surface 72. Upper airfoil surface 70 is at least partially defined by upper skin panel 34, while lower airfoil surface 72 is at least partially defined by lower skin panel 36. In some examples, upper airfoil surface 70 and/or lower airfoil surface 72 may be at least partially defined by secondary structural element 28. For example, in the example shown in FIG. 2, a portion of lower airfoil surface 72 adjacent trailing edge 24 is defined by secondary structural element 28, and the portion of lower airfoil surface 72 forward of middle C-channel spar 60 is defined by upper skin panel 34. On the other hand, the entire upper airfoil surface 70 is defined by upper skin panel 34. Other arrangements are also within the scope of the present disclosure.

Trailing edge 24 of structural composite airfoil 10 may be defined by secondary structural element 28. In various examples of structural composite airfoil 10, secondary structural element 28 may include a wedge closeout, a duckbill closeout, a bonded closeout, and/or a riveted closeout. Examples of suitable trailing edge closeouts are also disclosed in U.S. Pat. No. 10,532,804, issued on Jan. 14, 2020, and titled AERODYNAMIC CONTROL SURFACE AND ASSOCIATED TRAILING EDGE CLOSE-OUT METHOD, the entire disclosure of which is hereby incorporated by reference herein in its entirety for all purposes. In some examples, upper trailing edge end 92 may be coupled to lower trailing edge end 94. Additionally or alternatively, upper trailing edge end 92 and/or lower trailing edge end 94 may form or define trailing edge 24 of structural composite airfoil 10.

Examples of presently disclosed structural composite airfoils 10 may be configured for interfacing between components or elements (e.g., interfacing upper leading edge end 76 and lower leading edge end 78) without utilizing splice straps, and/or may allow for a part count reduction by reducing or eliminating the number of splice straps, nut plates, and/or other fasteners used in assembling structural composite airfoils 10. However, structural composite airfoil 10 may include one or more fasteners securing various components to each other. For example, a first fastener 80 may couple upper skin panel 34 to upper flange 66 of middle C-channel spar 60. First fastener 80 is a hi-lock fastener in some examples of structural composite airfoil 10. For example, because middle C-channel spar 60 may be oriented to face trailing edge 24, both sides of first fastener 80 may be accessible during assembly before lower skin 36 is coupled to lower flange 44 of middle C-channel spar 60. This arrangement may allow for the use of lower cost fasteners for first fastener 80, and/or reduce the complexity and/or install time for first fastener 80 because it may be accessible from both sides of upper flange 42 when first fastener 80 is installed. In some examples, first fastener 80 may be a plurality of first fasteners 80 spaced apart along the width of structural composite airfoil 10 (the width of the airfoil extending into/out of the page) to secure upper skin panel 34 to upper flange 66. Similarly, a second fastener 82 may couple lower flange 68 of middle C-channel spar 60 to upper skin panel 34 and lower skin panel 36. Second fastener 82 may be a plurality of second fasteners 82 spaced apart along the width of structural composite airfoil 10 to secure lower flange 68 to upper skin panel 34 and lower skin panel 36. One or more other fasteners 84 may be used to secure various components of structural composite airfoil 10, such as to secure lower trailing edge end 94 to upper skin panel 34 (e.g., upper trailing edge end 92). Additionally or alternatively, one or more fasteners 84 may be used to couple secondary structural element 28 to upper trailing edge end 92 and/or lower trailing edge end 94.

Middle C-channel spar 60 may form part of primary structural element 26. In the example shown in FIG. 2, primary structural element 26 is defined by leading edge 22 formed by upper skin panel 34 and lower skin panel 36, middle C-channel spar 60, integral Z-spar 100, and the respective portions of upper skin panel 34 and lower skin panel 36 extending between leading edge 22 and integral Z-spar 100. In other examples of structural composite airfoil 10, primary structural element 26 may extend further further aft towards trailing edge 24 than is illustrated in FIG. 2.

Structural composite airfoil 10 has a length 90, which may also be referred to herein as a chord length 90, and a position along length 90 may be defined in terms of a percentage of the distance along length 90 from leading edge 22. In these terms, integral Z-spar 100 may be positioned between 80%-95% of length 90 away from leading edge 22. Additionally or alternatively, middle C-channel spar 60 may be positioned between 30%-60% of length 90 away from leading edge 22, such as at about 40% of length 90 away from leading edge 22. Additionally or alternatively, middle C-channel spar 60 may be positioned between 35-45% of chord length 90 away from leading edge 22. Upper skin panel 34 may be coupled to lower skin panel 36 at a position along lower airfoil surface 72 that is between 35-45% of chord length 90 away from leading edge 22, such as at about 40% of chord length 90 away from leading edge 22 in a specific example. In this manner, leading edge 22 may have a smooth aerodynamic surface absent of joggles, disruptions, or hardware, all the way from leading edge 22 to the engagement between upper skin panel 34 and lower skin panel 36, which may be at least 35% of chord length 90 away from leading edge 22. In some examples, middle C-channel spar 60 may be positioned for balancing torsional capability within primary structural element 26 on either side of middle C-channel spar 60. For example, middle C-channel spar 60 may effectively separate internal volume 40 into a forward internal volume 42 and an aft internal volume 44, with forward internal volume 42 being forward of middle C-channel spar 60 and aft internal volume 44 being aft of middle C-channel spar 60.

In some examples, the volume of forward internal volume 42 is within 10% of the volume of aft internal volume 44. In some examples, the volume of forward internal volume 42 is at least approximately equal to the volume of aft internal volume 44.

Figure 3:
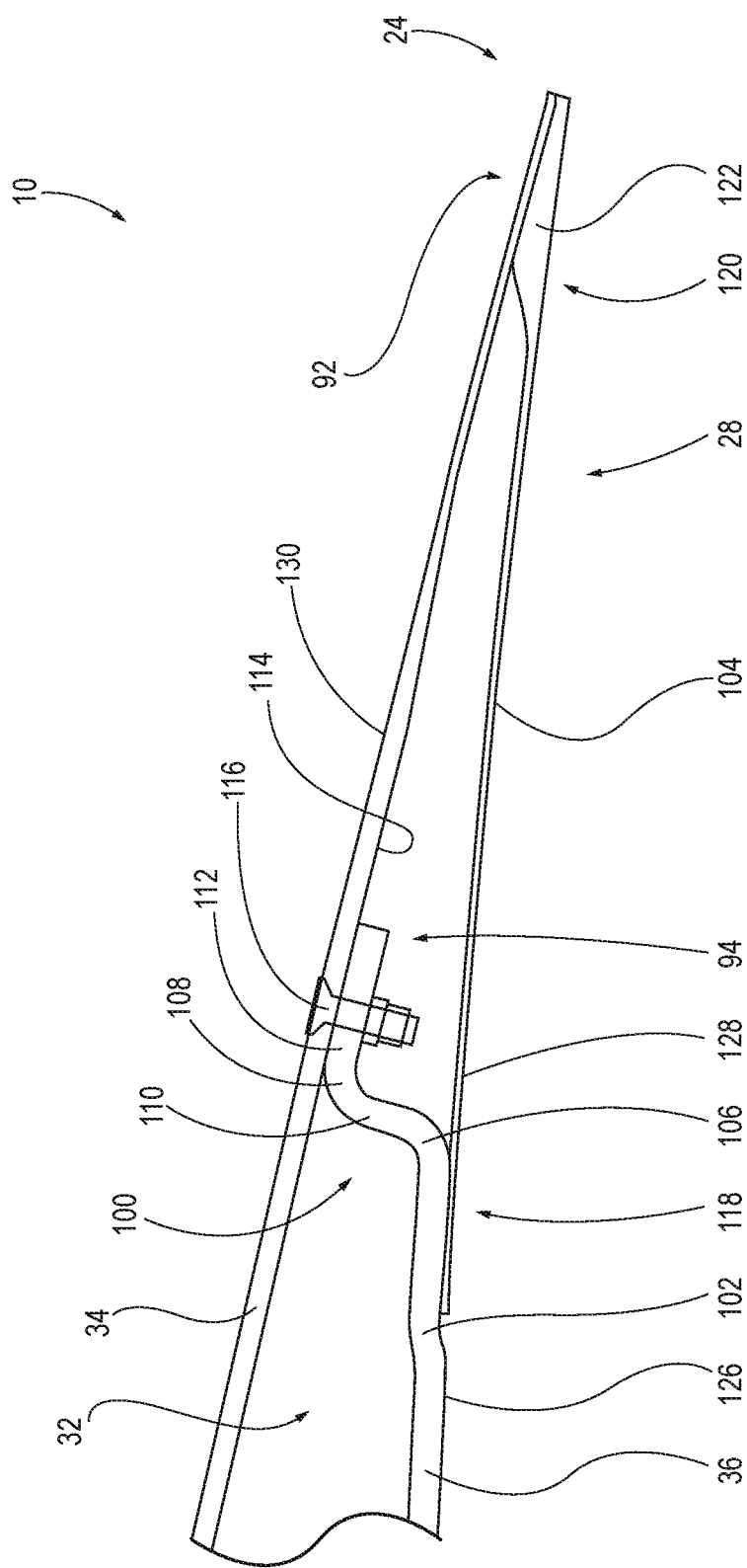
FIG. 3 is a side elevation view of an integral Z-spar formed in a lower skin panel.
Figure 4:
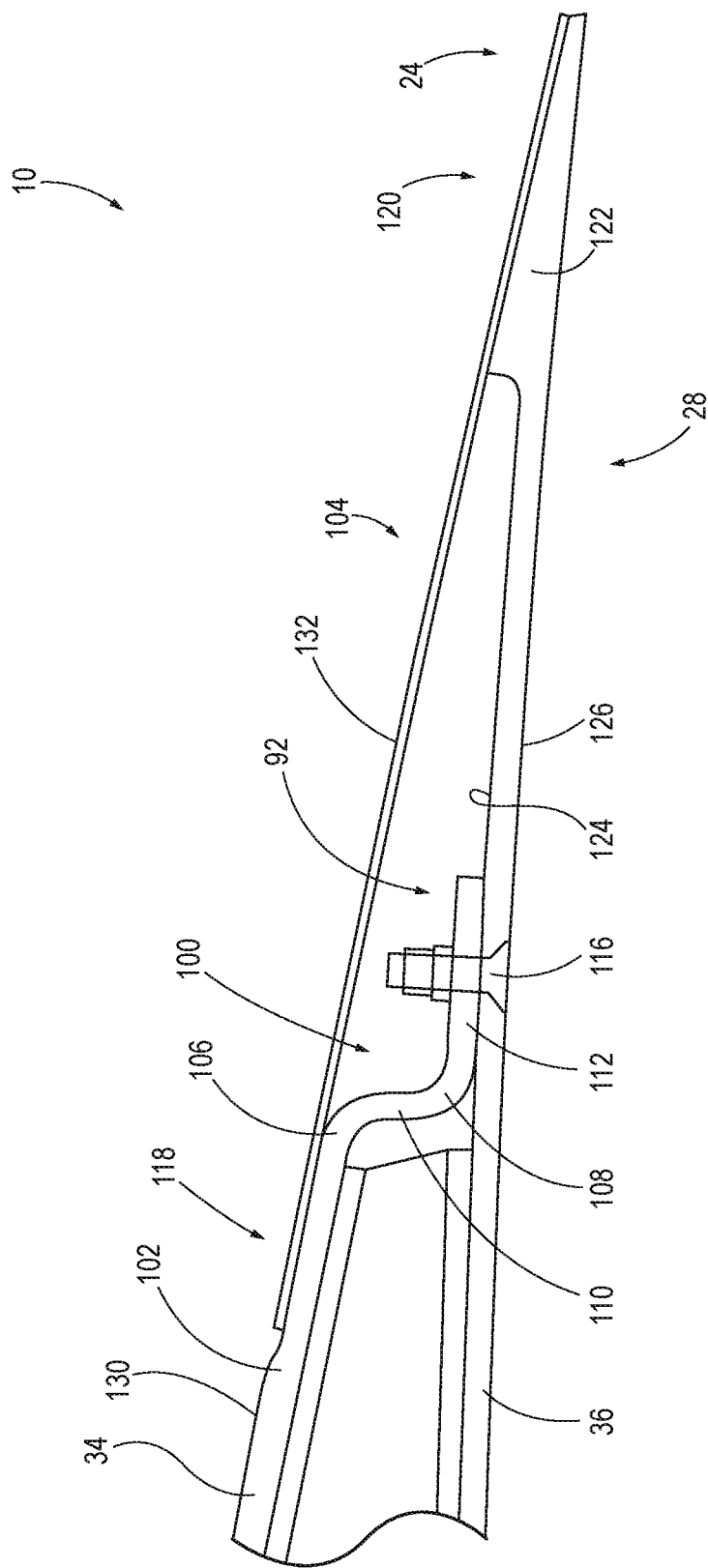
FIG. 4 is a side elevation view of an integral Z-spar formed in an upper skin panel.

Some examples of structural composite airfoil 10 include integral Z-spar 100, which may be a part of primary structural element 26, with elements aft of integral Z-spar 100 being part of secondary structural element 28 in some examples. Thus, positioning integral Z-spar 100 aft of middle C-channel spar 60 may lengthen, or extend, the length of primary structural element 26, and/or may increase the percentage of length 90 of structural composite airfoil 10 that corresponds to primary structural element 26. In some examples, integral Z-spar 100 may be formed within trailing edge region 32 of primary structural element 26. FIGS. 3-4 illustrate examples of such integral Z-spars 100, with FIG. 3 illustrating an example of integral Z-spar 100 formed in lower skin panel 36, and FIG. 4 illustrating an example of integral Z-spar 100 formed in upper skin panel 34. Integrating components such as integral Z-spar 100 into upper skin panel 34 and/or lower skin panel 36 in various examples of structural composite airfoil 10 may allow for a reduction in fasteners and/or overall part count. Integral Z-spar 100 is generally positioned adjacent trailing edge 24 of structural composite airfoil 10, such as by being positioned at least 80% of chord length 90 away from leading edge 22. In some examples, integral Z-spar 100 may be positioned between 80-95% of chord length 90 away from leading edge 22.

With reference to FIG. 3, integral Z-spar 100 may be formed in lower trailing edge end 94 of lower skin panel 36. Integral Z-spar 100 may include a first bend 106, a second bend 108, and a first Z-spar segment 110 extending between first bend 106 and second bend 108. In some examples, first Z-spar segment 110 may be at least substantially perpendicular to lower skin panel 36 and/or upper skin panel 34. In some examples, first Z-spar segment 110 may form an angle with lower skin panel 36 that is greater than 90 degrees, and/or greater than 100 degrees. Additionally or alternatively, first Z-spar segment 110 may form an angle with upper skin panel 34 that is greater than 90 degrees, and/or greater than 100 degrees. Integral Z-spar 100 may further include a second Z-spar segment 112 extending aft of second bend 108. Second Z-spar segment 112 may be coupled to upper skin panel 34, as shown in FIG. 3. In the example shown in FIG. 3, second Z-spar segment 112 is positioned adjacent an interior surface 114 of upper skin panel 34. A Z-spar fastener 116 may couple integral Z-spar 100 to upper skin panel 34. In some examples, Z-spar fastener 116 is recessed into upper skin panel 34 (e.g., such that Z-spar fastener 116 is at least substantially flush or sub-flush with an upper panel surface 130 of upper skin panel 34) and extends through upper skin panel 34 and second Z-spar segment 112 to couple integral Z-spar 100 to upper skin panel 34. In some examples, Z-spar fastener 116 may be accessible from both sides of upper skin panel 34, and thus is not a blind fastener in some examples. For example, Z-spar fastener 116 may be a regular Hi-Lok® fastener, a rivet, a lock bolt, or other fastener. Because Z-spar fastener 116 may be accessible from both sides, this may facilitate lower cost installations due to the ability to use simpler fasteners than in prior art examples.

Integral Z-spar 100 may include a Z-spar joggle 102 in lower skin panel 36 that may be configured to receive a portion of a trailing edge closeout cover 104, which may at least partially define secondary structural element 28 and/or trailing edge 24 of structural composite airfoil 10. Z-spar joggle 102 is effectively a small shift in lower skin panel 36 upwards toward upper skin panel 34, and generally is positioned forward of first bend 106. A first cover end region 118 of trailing edge closeout cover 104 may be bonded to lower skin panel 36, as shown in FIG. 3. Additionally or alternatively, first cover end region 118 may be riveted or otherwise fastened or coupled to lower skin panel 36. To create a smooth surface at the interface and improve aerodynamic performance, first cover end region 118 may be slightly recessed into lower skin panel 36, such as via Z-spar joggle 102, as shown in FIG. 3. Z-spar joggle 102 may be tailored to create a greater or smaller recess in lower skin panel 36, depending on the thickness of first cover end region 118, such that a lower panel surface 126 of lower skin panel 36 is substantially flush with a lower cover surface 128 of trailing edge closeout cover 104 within first cover end region 118. In other words, Z-spar joggle 102 may be larger to create a bigger recess to receive and engage with a given trailing edge closeout cover 104 having a thicker first cover end region 118, whereas Z-spar joggle 102 may be smaller to create a smaller recess to receive and engage with a different given trailing edge closeout cover 104 having a thinner first cover end region 118. Any gaps remaining at the interface of Z-spar joggle 102 and first cover end region 118 (or elsewhere on structural composite airfoil 10) may be filled with a sealant, a filler material, and/or a resin, and then smoothed.

A second cover end region 120 of trailing edge closeout cover 104 may include an integral wedge 122 that may be coupled (e.g., bonded and/or coupled via one or more fasteners) to upper skin panel 34, as shown in FIG. 3. Alternatively, integral wedge 122 may be integrally formed with upper skin panel 34. In still other examples, integral wedge 122 may be a discrete component separate from trailing edge closeout cover 104 and separate from upper skin panel 34, and which may be bonded or otherwise coupled to upper skin panel 34 and/or trailing edge closeout cover 104. As an example, integral wedge 122 may be formed by building up plies of material, molding, and/or by machining a mating face profile to mate with upper skin panel 34.

With reference to FIG. 4, integral Z-spar 100 may be formed in upper trailing edge end 92 of upper skin panel 34. In the example shown in FIG. 4, second Z-spar segment 112 is coupled to lower skin panel 36, and is positioned adjacent an interior surface 124 of lower skin panel 36. Z-spar fastener 116 couples integral Z-spar 100 to lower skin panel 36, with Z-spar fastener 116 being recessed into lower skin panel 36 (e.g., such that Z-spar fastener 116 is at least substantially flush or sub-flush with lower panel surface 126 of lower skin panel 36) and extending through lower skin panel 36 and second Z-spar segment 112 to couple integral Z-spar 100 to lower skin panel 36. In some examples, Z-spar fastener 116 may be accessible from both sides of lower skin panel 36, and thus is not a blind fastener in some examples. For example, Z-spar fastener 116 may be a regular Hi-Lok® fastener, a rivet, a lock bolt, or other fastener. Because Z-spar fastener 116 may be accessible from both sides, this may facilitate lower cost installations due to the ability to use simpler fasteners than in prior art examples.

In FIG. 4, integral Z-spar 100 includes Z-spar joggle 102 in upper skin panel 34 that is configured to receive a portion of trailing edge closeout cover 104, with Z-spar joggle 102 being positioned forward of first bend 106. Z-spar joggle 102 is effectively a small shift in upper skin panel 34 toward lower skin panel 36. First cover end region 118 of trailing edge closeout over 104 is bonded to upper skin panel 34 instead of lower skin panel 36 in this example. Additionally or alternatively, first cover end region 118 may be riveted or otherwise fastened or coupled to upper skin panel 34. To create a smooth surface at the interface and improve aerodynamic performance, first cover end region 118 may be slightly recessed into upper skin panel 34, such as via Z-spar joggle 102, as shown in FIG. 4. Z-spar joggle 102 may be tailored to create a greater or smaller recess in upper skin panel 34, depending on the thickness of first cover end region 118, such that an upper panel surface 130 of upper skin panel 34 is substantially flush with an upper cover surface 132 of trailing edge closeout cover 104 within first cover end region 118. In other words, Z-spar joggle 102 may be larger to create a bigger recess to receive and engage with a given trailing edge closeout cover 104 having a thicker first cover end region 118, whereas Z-spar joggle 102 may be smaller to create a smaller recess to receive and engage with a different given trailing edge closeout cover 104 having a thinner first cover end region 118.

Second cover end region 120 of trailing edge closeout cover 104 may include integral wedge 122 that may be coupled (e.g., bonded and/or coupled via one or more fasteners) to lower skin panel 36. Alternatively, and as shown in FIG. 4, integral wedge 122 may be integrally formed with lower skin panel 36. In still other examples, integral wedge 122 may be a discrete component separate from trailing edge closeout cover 104 and separate from lower skin panel 36, and which may be bonded or otherwise coupled to lower skin panel 36 and/or trailing edge closeout cover 104. Integral wedge 122 may be formed, for example, by building up plies of material, molding, and/or by machining a mating face profile to mate with lower skin panel 36.

Figure 5:
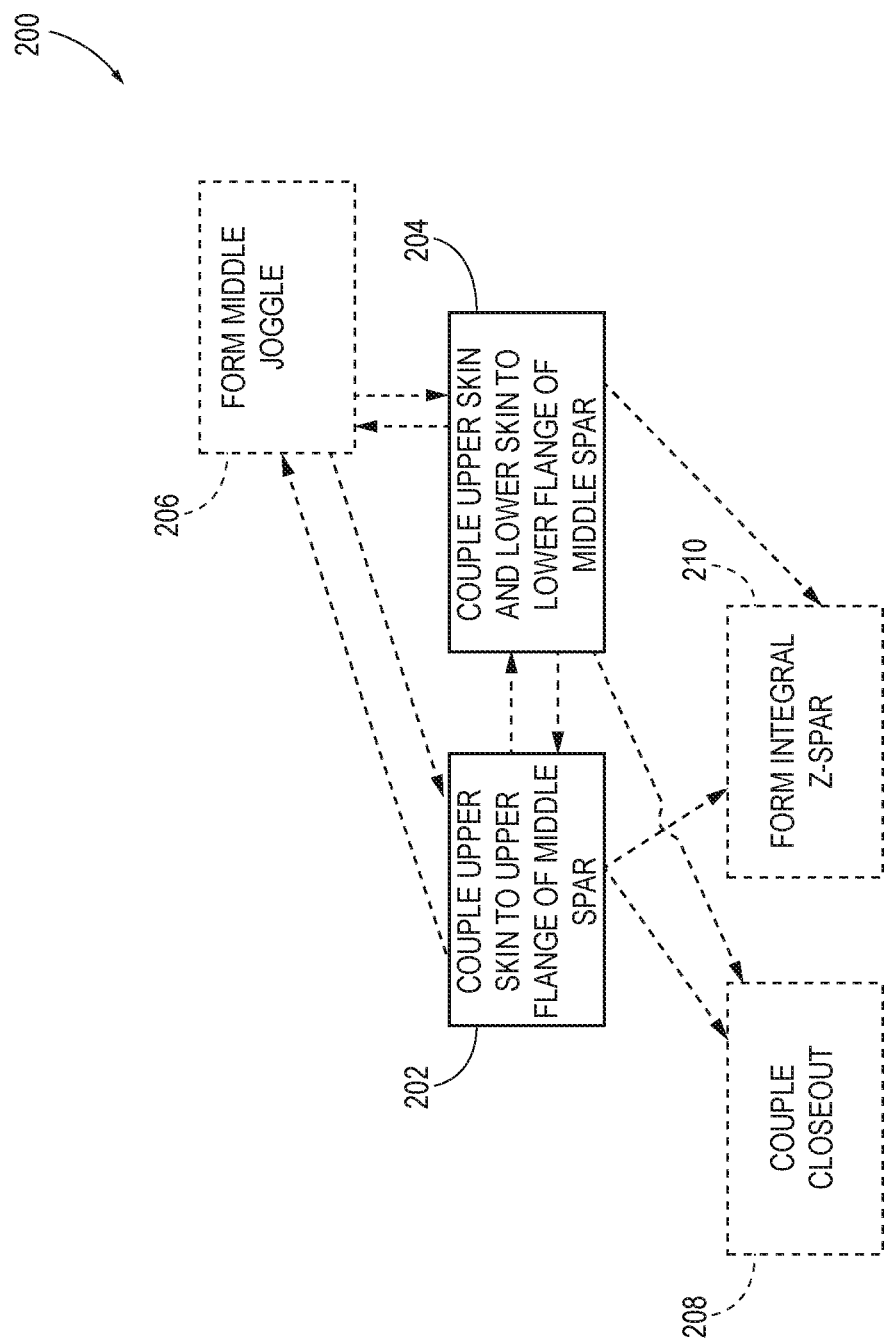
FIG. 5 is a flowchart diagram representing disclosed methods of forming disclosed structural composite airfoils.

FIG. 5 schematically provides a flowchart that represents illustrative, non-exclusive examples of methods 200 according to the present disclosure. In FIG. 5, some steps are illustrated in dashed boxes indicating that such steps may be optional or may correspond to an optional version of a method according to the present disclosure. That said, not all methods 200 according to the present disclosure are required to include the steps illustrated in solid boxes. The methods 200 and steps illustrated in FIG. 5 are not limiting and other methods and steps are within the scope of the present disclosure, including methods having greater than or fewer than the number of steps illustrated, as understood from the discussions herein.

Methods 200 generally include coupling an upper skin panel (e.g., upper skin panel 34) to an upper flange of a middle C-channel spar (e.g., upper flange 66 of middle C-channel spar 60), at 202, and coupling the upper skin panel and a lower skin panel (e.g., lower skin panel 36) to a lower flange of the middle C-channel spar (e.g., lower flange 68), at 204. Coupling the upper skin panel and the lower skin panel to the lower flange at 204 generally includes coupling a lower leading edge end (e.g., lower leading edge end 78) of the lower skin panel to a upper leading edge end (e.g., upper leading edge end 76) of the upper skin panel. In some examples, said coupling of the upper skin panel and the lower skin panel to the lower flange at 204 includes overlapping a portion of the upper skin panel adjacent the upper leading edge end with a portion of the lower skin panel adjacent the lower leading edge end. Coupling the upper skin panel and the lower skin panel to the middle C-channel spar at 202 and 204 may include positioning the middle C-channel spar such that an internal volume (e.g., internal volume 40) is effectively separated into a forward internal volume (e.g., forward internal volume 42) and an aft internal volume (e.g., aft internal volume 44), with a first volume of the forward internal volume being within 10% of a second volume of the aft internal volume, in some examples.

Methods 200 may include forming a middle joggle (e.g., middle joggle 54) in the upper skin panel or lower skin panel, at 206. For example, forming the middle joggle at 206 may include forming a middle joggle adjacent or within the lower leading edge end, wherein the middle joggle is configured to receive the upper leading edge end of the upper skin panel. In other examples, forming a middle joggle at 206 may include forming a middle joggle adjacent or within the upper leading edge end of the upper skin panel, wherein the middle joggle is configured to receive the lower leading edge end of the lower skin panel.

Some methods 200 further include coupling a closeout (e.g., trailing edge closeout cover 104) to the upper skin panel and the lower skin panel, at 208. Additionally or alternatively, methods 200 may include forming an integral Z-spar (e.g., integral Z-spar 100) in the lower skin panel or upper skin panel, at 210. Forming the integral Z-spar at 210 may include coupling the integral Z-spar to the lower skin panel (e.g., when the integral Z-spar is formed in the upper skin panel), or may include coupling the integral Z-spar to the upper skin panel (e.g., when the integral Z-spar is formed in the lower skin panel).

Illustrative, non-exclusive examples of inventive subject matter according to the present disclosure are described in the following enumerated paragraphs:

A1. A structural composite airfoil (10) having a leading edge (22) and a trailing edge (24), the structural composite airfoil (10) comprising:

a primary structural element (26) extending from a leading edge region (30) to a trailing edge region (32), wherein the leading edge region (30) of the primary structural element (26) forms the leading edge (22) of the structural composite airfoil (10), wherein the primary structural element (26) comprises:

an upper skin panel (34) extending from an upper leading edge end (76) to an upper trailing edge end (92);

a lower skin panel (36) extending from a lower leading edge end (78) to a lower trailing edge end (94);

an internal volume (40), wherein the internal volume (40) is defined between the upper skin panel (34) and the lower skin panel (36) aft of a middle C-channel spar (60), and wherein the internal volume (40) is defined by the upper skin panel (34) forward of the middle C-channel spar (60); and the middle C-channel spar (60) comprising an upper flange (66) coupled to the upper skin panel (34), wherein the middle C-channel spar (60) further comprises a lower flange (68) coupled to the lower skin panel (36) and the upper skin panel (34), wherein the lower leading edge end (78) of the lower skin panel (36) is coupled to the upper skin panel (34); and a secondary structural element (28) defining the trailing edge (24) of the structural composite airfoil (10).

A2. The structural composite airfoil (10) of paragraph A1, wherein the middle C-channel spar (60) faces the trailing edge (24) of the structural composite airfoil (10).

A3. The structural composite airfoil (10) of any of paragraphs A1-A2, wherein the upper leading edge end (76) of the upper skin panel (34) overlaps the lower leading edge end (78).

A4. The structural composite airfoil (10) of any of paragraphs A1-A3, wherein the lower leading edge end (78) comprises a middle joggle (54) configured to receive the upper leading edge end (76) of the upper skin panel (34).

A4.1. The structural composite airfoil (10) of any of paragraphs A1-A3, wherein the upper leading edge end (76) comprises a middle joggle (54) configured to receive the lower leading edge end (78) of the lower skin panel (36).

A5. The structural composite airfoil (10) of any of paragraphs A1-A4.1, wherein the lower flange (68) is coupled to the upper leading edge end (76) of the upper skin panel (34).

A6. The structural composite airfoil (10) of any of paragraphs A1-A5, wherein the lower flange (68) is coupled to the lower leading edge end (78) of the lower skin panel (36).

A7. The structural composite airfoil (10) of any of paragraphs A1-A6, further comprising a sealant configured to smooth a lower airfoil surface (72) of the structural composite airfoil (10) where the upper leading edge end (76) of the upper skin panel (34) is coupled to the lower leading edge end (78).

A8. The structural composite airfoil (10) of any of paragraphs A1-A7, further comprising a hi-lock fastener coupling the upper flange (66) to the upper skin panel (34).

A9. The structural composite airfoil (10) of any of paragraphs A1-A8, wherein the structural composite airfoil (10) does not include a front C-channel spar.

A10. The structural composite airfoil (10) of any of paragraphs A1-A9, wherein the structural composite airfoil (10) comprises an upper airfoil surface (70) and a/the lower airfoil surface (72).

A11. The structural composite airfoil (10) of paragraph A10, wherein the upper airfoil surface (70) is defined by the upper skin panel (34).

A12. The structural composite airfoil (10) of paragraph A10 or A11, wherein the lower airfoil surface (72) is defined by the lower skin panel (36) and the upper skin panel (34).

A13. The structural composite airfoil (10) of any of paragraphs A1-A12, wherein the upper skin panel (34) is continuous from the upper leading edge end (76) to the upper trailing edge end (92).

A14. The structural composite airfoil (10) of any of paragraphs A1-A13, wherein the upper skin panel (34) forms the leading edge (22) of the structural composite airfoil (10).

A15. The structural composite airfoil (10) of any of paragraphs A1-A14, wherein the lower skin panel (36) is continuous from the lower leading edge end (78) to the lower trailing edge end (94).

A16. The structural composite airfoil (10) of any of paragraphs A1-A15, wherein the lower trailing edge end (94) is coupled to the upper skin panel (34).

A17. The structural composite airfoil (10) of any of paragraphs A1-A16, wherein the lower skin panel (36) comprises an integral Z-spar (100) at the lower trailing edge end (94).

A18. The structural composite airfoil (10) of any of paragraphs A1-A17, wherein the primary structural element (26) comprises an/the integral Z-spar (100).

A19. The structural composite airfoil (10) of paragraph A17 or A18, wherein the integral Z-spar (100) is formed by the lower skin panel (36) within the trailing edge region (32) of the primary structural element (26).

A20. The structural composite airfoil (10) of any of paragraphs A17-A19, wherein the integral Z-spar (100) comprises a joggle configured to receive a portion of the secondary structural element (28).

A21. The structural composite airfoil (10) of any of paragraphs A17-A20, wherein the integral Z-spar (100) comprises a first bend (106), a second bend (108), and a first Z-spar segment (110) extending between the first bend (106) and the second bend (108).

A22. The structural composite airfoil (10) of paragraph A21, wherein the first Z-spar segment (110) is substantially perpendicular to the lower skin panel (36) and/or substantially perpendicular to the upper skin panel (34).

A23. The structural composite airfoil (10) of paragraph A21 or A22, wherein the integral Z-spar (100) further comprises a second Z-spar segment (112) extending aft of the second bend (108), wherein the second Z-spar segment (112) is coupled to the upper skin panel (34).

A24. The structural composite airfoil (10) of paragraph A23, wherein the second Z-spar segment (112) is adjacent an interior surface (114) of the upper skin panel (34).

A25. The structural composite airfoil (10) of paragraph A23 or A24, wherein the second Z-spar segment (112) is coupled to the upper skin panel (34) via a Z-spar fastener (116), wherein the Z-spar fastener (116) is recessed into the upper skin panel (34), and wherein the Z-spar fastener (116) extends through the second Z-spar segment (112).

A25.1. The structural composite airfoil (10) of paragraph A25, wherein the Z-spar fastener (116) is not blind.

A25.2. The structural composite airfoil (10) of paragraph A25 or A25.1, wherein the Z-spar fastener (116) comprises a Hi-Lok® fastener, a rivet, and/or a lock bolt.

A26. The structural composite airfoil (10) of any of paragraphs A27-A25.2, wherein a/the joggle of the integral Z-spar (100) is forward of the first bend (106).

A27. The structural composite airfoil (10) of any of paragraphs A1-A26, wherein the structural composite airfoil (10) has a chord length (90), and wherein a position along the chord length (90) may be defined by a percentage of the distance along the chord length (90) from the leading edge (22).

A28. The structural composite airfoil (10) of paragraph A27, wherein the middle C-channel spar (60) is positioned between 30%-60% of the chord length (90) away from the leading edge (22), and/or between 35-45% of the chord length (90) away from the leading edge (22).

A29. The structural composite airfoil (10) of paragraph A28, wherein the middle C-channel spar (60) is positioned at about 40% of the chord length (90) away from the leading edge (22).

A30. The structural composite airfoil (10) of any of paragraphs A27-A29, wherein an/the integral Z-spar (100) is positioned between 80-95% of the chord length (90) away from the leading edge (22).

A31. The structural composite airfoil (10) of any of paragraphs A27-A30, wherein the upper skin panel (34) is coupled to the lower skin panel (36) at a position along a/the lower airfoil surface (72) that is between 35-45% of the chord length (90) away from the leading edge (22).

A32. The structural composite airfoil (10) of any of paragraphs A1-A31, further comprising a first fastener (80) coupling the upper skin panel (34) to the upper flange (66) of the middle C-channel spar (60).

A33. The structural composite airfoil (10) of any of paragraphs A1-A32 further comprising a second fastener (82) coupling the upper skin panel (34) and the lower skin panel (36) to the lower flange (68) of the middle C-channel spar (60).

A34. The structural composite airfoil (10) of any of paragraphs A1-A33, wherein at least a portion of the upper skin panel (34) is core stiffened.

A34.1. The structural composite airfoil (10) of paragraph A34, wherein the upper skin panel (34) comprises a first upper core stiffened portion (134).

A34.2. The structural composite airfoil (10) of paragraph A34.1, wherein the first upper core stiffened portion (134) is forward of the middle C-channel spar (60).

A34.3 The structural composite airfoil (10) of paragraph A34.1 or A34.2, wherein at least a portion of the first upper core stiffened portion (134) forms the leading edge (22) of the structural composite airfoil (10).

A34.4. The structural composite airfoil (10) of any of paragraphs A34-A34.3, wherein the first upper core stiffened portion (134) extends forward of the middle C-channel spar (60) along an/the upper airfoil surface (70), around the leading edge (22) of the structural composite airfoil (10), and then aft towards the middle C-channel spar (60) along a/the lower airfoil surface (72).

A34.5. The structural composite airfoil (10) of any of paragraphs A34-A34.4, wherein the upper skin panel (34) further comprises a second upper core stiffened portion (136) positioned between the middle C-channel spar (60) and the upper trailing edge end (92).

A34.6. The structural composite airfoil (10) of any of paragraphs A34-A34.5, wherein the first upper core stiffened portion (134) and/or the second upper core stiffened portion (136) comprises an overexpanded honeycomb core.

A35. The structural composite airfoil (10) of any of paragraphs A1-A34.6, wherein at least a portion of the lower skin panel (36) is core stiffened.

A35.1. The structural composite airfoil (10) of paragraph A35, wherein the lower skin panel (36) comprises a lower core stiffened portion (142) positioned between the lower leading edge end (78) and the lower trailing edge end (94).

A35.2. The structural composite airfoil (10) of paragraph A35.1, wherein the lower core stiffened portion (142) is positioned aft of the middle C-channel spar (60).

A35.3. The structural composite airfoil (10) of any of paragraphs A35-A35.2, wherein the lower core stiffened portion (142) comprises an overexpanded honeycomb core.

A36. The structural composite airfoil (10) of any of paragraphs A1-A35.3, wherein the upper skin panel (34) comprises fiberglass or carbon fiber.

A37. The structural composite airfoil (10) of any of paragraphs A1-A36, wherein the lower skin panel (36) comprises fiberglass or carbon fiber.

A38. The structural composite airfoil (10) of any of paragraphs A1-A37, wherein the structural composite airfoil (10) is a trailing edge flap (17), an aileron, a flaperon, an air brake, an elevator, a slat, a spoiler, a canard, a rudder, and/or a winglet.

A39. The structural composite airfoil (10) of any of paragraphs A1-A38, wherein the secondary structural element (28) comprises a wedge closeout.

A40. The structural composite airfoil (10) of any of paragraphs A1-A39, wherein the secondary structural element (28) comprises a duckbill closeout.

A41. The structural composite airfoil (10) of any of paragraphs A1-A40, wherein the secondary structural element (28) comprises a bonded closeout.

A42. The structural composite airfoil (10) of any of paragraphs A1-A41, wherein the secondary structural element (28) comprises a riveted closeout.

A43. The structural composite airfoil (10) of any of paragraphs A1-A42, wherein the lower trailing edge end (94) of the lower skin panel (36) end is coupled to the upper skin panel (34).

A44. The structural composite airfoil (10) of any of paragraphs A1-A43, wherein the upper trailing edge end (92) of the upper skin panel (34) is coupled to the secondary structural element (28).

A45. The structural composite airfoil (10) of any of paragraphs A1-A44, wherein the middle C-channel spar (60) effectively separates the internal volume (40) into a forward internal volume (42) and an aft internal volume (44), wherein the forward internal volume (42) is forward of the middle C-channel spar (60), and wherein the aft internal volume (44) is aft of the middle C-channel spar (60).

A46. The structural composite airfoil (10) of paragraph A45, wherein the middle C-channel spar (60) is positioned such that a first volume of the forward internal volume (42) is within 10% of a second volume of the aft internal volume (44).

B1. An aircraft (14) comprising the structural composite airfoil (10) of any of paragraphs A1-A46.

B2. A trailing edge flap (17) for an aircraft (14) comprising the structural composite airfoil (10) of any of paragraphs A1-A46.

C1. A method (200) of assembling a structural composite airfoil (10), the method (200) comprising:

coupling (202) an upper skin panel (34) to an upper flange (66) of a middle C-channel spar (60), wherein the structural composite airfoil (10) extends from a leading edge (22) to a trailing edge (24), wherein the middle C-channel spar (60) comprises the upper flange (66), a lower flange (68), and an elongated span extending between the upper flange (66) and the lower flange (68), and wherein the upper skin panel (34) extends from a upper leading edge end (76) to an upper trailing edge end (92); and coupling (204) the upper skin panel (34) and a lower skin panel (36) to the lower flange (68) of the middle C-channel spar (60) such that an internal volume (40) is defined between the upper skin panel (34) and the lower skin panel (36) aft of the middle C-channel spar (60), and such that the internal volume (40) is defined by the upper skin panel (34) forward of the middle C-channel spar (60), wherein the upper skin panel (34), the lower skin panel (36), and the middle C-channel spar (60) together form at least a portion of a primary structural element (26) of the structural composite airfoil (10), and wherein the lower skin panel (36) extends from a lower leading edge end (78) to a lower trailing edge end (94).

C2. The method (200) of paragraph C1, wherein the coupling (204) the upper skin panel (34) and the lower skin panel (36) to the lower flange (68) comprises coupling the lower leading edge end (78) of the lower skin panel (36) to the upper leading edge end (76) of the upper skin panel (34).

C3. The method (200) of any of paragraphs C1-C2, wherein the structural composite airfoil (10) is the structural composite airfoil (10) of any of paragraphs A1-A46.

C4. The method (200) of any of paragraphs C1-C3, further comprising coupling (208) a/the closeout to the upper skin panel (34) and the lower skin panel (36), wherein the closeout defines the trailing edge (24) of the structural composite airfoil (10).

C5. The method (200) of any of paragraphs C1-C4, further comprising forming (210) an/the integral Z-spar (100) in the lower skin panel (36).

C6. The method (200) of paragraph C5, further comprising coupling the integral Z-spar (100) to the upper skin panel (34).

C7. The method (200) of any of paragraphs C1-C6, further comprising forming (206) a middle joggle (54) adjacent or within the lower leading edge end (78), wherein the middle joggle (54) is configured to receive the upper leading edge end (76) of the upper skin panel (34).

C8. The method (200) of any of paragraphs C1-C7, wherein the coupling (204) the upper skin panel (34) and the lower skin panel (36) to the lower flange (68) comprises overlapping a portion of the upper skin panel (34) adjacent the upper leading edge end (76) with and a portion of the lower skin panel (36) adjacent the lower leading edge end (78).

C9. The method (200) of any of paragraphs C1-C8, further comprising positioning the middle C-channel spar (60) such that the internal volume (40) is effectively separated into a/the forward internal volume (42) and an/the aft internal volume (44), and wherein a/the first volume of the forward internal volume (42) is within 10% of a/the second volume of the aft internal volume (44).

D1. The use of the structural composite airfoil (10) of any of paragraphs A1-A46 as an inboard flap (17) for an aircraft (14).

D2. The use of the structural composite airfoil (10) of any of paragraphs A1-A46 as an outboard flap (17) for an aircraft (14).

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, or A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A structural composite airfoil having a leading edge and a trailing edge, the structural composite airfoil comprising:
a primary structural element extending from a leading edge region to a trailing edge region, wherein the leading edge region of the primary structural element forms the leading edge of the structural composite airfoil, wherein the primary structural element comprises:
an upper skin panel extending from an upper leading edge end to an upper trailing edge end;
a lower skin panel extending from a lower leading edge end to a lower trailing edge end;
an internal volume, wherein the internal volume is defined between the upper skin panel and the lower skin panel aft of a middle C-channel spar, and wherein the internal volume is defined by the upper skin panel forward of the middle C-channel spar; and
the middle C-channel spar comprising an upper flange coupled to the upper skin panel, wherein the middle C-channel spar further comprises a lower flange coupled to the lower skin panel and the upper skin panel, wherein the lower leading edge end of the lower skin panel is coupled to the upper skin panel; and
a secondary structural element defining the trailing edge of the structural composite airfoil.

2. The structural composite airfoil according to claim 1, wherein the middle C-channel spar faces the trailing edge of the structural composite airfoil.

3. The structural composite airfoil according to claim 1, wherein the upper leading edge end of the upper skin panel overlaps the lower leading edge end.

4. The structural composite airfoil according to claim 1, wherein the lower leading edge end comprises a middle joggle configured to receive the upper leading edge end of the upper skin panel.

5. The structural composite airfoil according to claim 1, wherein the upper leading edge end comprises a middle joggle configured to receive the lower leading edge end of the lower skin panel.

6. The structural composite airfoil according to claim 1, wherein the lower flange is coupled to the upper leading edge end of the upper skin panel, and wherein the lower flange is coupled to the lower leading edge end of the lower skin panel.

7. The structural composite airfoil according to claim 1, further comprising a hi-lock fastener coupling the upper flange to the upper skin panel.

8. The structural composite airfoil according to claim 1, wherein the structural composite airfoil comprises an upper airfoil surface and a lower airfoil surface, wherein the upper airfoil surface is defined by the upper skin panel, and wherein the lower airfoil surface is defined by the lower skin panel and the upper skin panel.

9. The structural composite airfoil according to claim 1, wherein the upper skin panel forms the leading edge of the structural composite airfoil.

10. The structural composite airfoil according to claim 1, wherein the lower skin panel comprises an integral Z-spar at the lower trailing edge end.

11. The structural composite airfoil according to claim 1, wherein the structural composite airfoil has a chord length, and wherein a position along the chord length may be defined by a percentage of a distance along the chord length from the leading edge, and wherein the middle C-channel spar is positioned between 35-45% of the chord length away from the leading edge.

12. The structural composite airfoil according to claim 1, wherein the upper skin panel comprises a first upper core stiffened portion, wherein the first upper core stiffened portion is forward of the middle C-channel spar, and wherein at least a portion of the first upper core stiffened portion forms the leading edge of the structural composite airfoil.

13. The structural composite airfoil according to claim 12, wherein the first upper core stiffened portion extends forward of the middle C-channel spar along an upper airfoil surface, around the leading edge of the structural composite airfoil, and then aft towards the middle C-channel spar along a lower airfoil surface.

14. The structural composite airfoil according to claim 13, wherein the upper skin panel further comprises a second upper core stiffened portion positioned between the middle C-channel spar and the upper trailing edge end.

15. The structural composite airfoil according to claim 13, wherein the first upper core stiffened portion comprises an overexpanded honeycomb core.

16. The structural composite airfoil according to claim 13, wherein the lower skin panel comprises a lower core stiffened portion positioned between the lower leading edge end and the lower trailing edge end, wherein the lower core stiffened portion is positioned aft of the middle C-channel spar.

17. An aircraft comprising the structural composite airfoil according to claim 1.

18. A trailing edge flap for an aircraft comprising the structural composite airfoil according to claim 1.

19. A method of assembling a structural composite airfoil, the method comprising:

coupling an upper skin panel to an upper flange of a middle C-channel spar, wherein the structural composite airfoil extends from a leading edge to a trailing edge, wherein the structural composite airfoil comprises a primary structural element extending from a leading edge region to a trailing edge region, wherein the leading edge region of the primary structural element forms the leading edge of the structural composite airfoil, wherein the middle C-channel spar comprises the upper flange, a lower flange, and an elongated span extending between the upper flange and the lower flange, and wherein the upper skin panel extends from an upper leading edge end to an upper trailing edge end; and coupling the upper skin panel and a lower skin panel to the lower flange of the middle C-channel spar such that an internal volume is defined between the upper skin panel and the lower skin panel aft of the middle C-channel spar, and such that the internal volume is defined by the upper skin panel forward of the middle C-channel spar, wherein the upper skin panel, the lower skin panel, the internal volume, and the middle C-channel spar together form at least a portion of the primary structural element of the structural composite airfoil, wherein the lower skin panel extends from a lower leading edge end to a lower trailing edge end, wherein the coupling the upper skin panel and the lower skin panel to the lower flange comprises coupling the lower leading edge end of the lower skin panel to the upper leading edge end of the upper skin panel, and wherein a secondary structural element defines the trailing edge of the structural composite airfoil.

20. The method according to claim 19, further comprising forming a middle joggle adjacent the lower leading edge end, wherein the middle joggle is configured to receive the upper leading edge end of the upper skin panel.

* * * * *